United States Patent
Gomyo et al.

(10) Patent No.: US 7,365,939 B2
(45) Date of Patent: Apr. 29, 2008

(54) DYNAMIC-PRESSURE BEARING DEVICE AND DISK DRIVE

(75) Inventors: Masato Gomyo, Kyoto (JP); Masayoshi Saichi, Kyoto (JP)

(73) Assignee: Nidec Corporation, Kyoto (JP)

( * ) Notice: Subject to any disclaimer, the term of this patent is extended or adjusted under 35 U.S.C. 154(b) by 381 days.

(21) Appl. No.: 10/904,113

(22) Filed: Oct. 25, 2004

(65) Prior Publication Data

US 2005/0088779 A1 Apr. 28, 2005

(30) Foreign Application Priority Data

Oct. 23, 2003 (JP) ............................. 2003-363815
Oct. 21, 2004 (JP) ............................. 2004-307389

(51) Int. Cl.
*G11B 17/02* (2006.01)

(52) U.S. Cl. .................................... 360/99.08

(58) Field of Classification Search ............ 360/99.08, 360/99.04, 98.07; 720/695; 369/270.1, 369/266, 269
See application file for complete search history.

(56) References Cited

U.S. PATENT DOCUMENTS

| | | | | |
|---|---|---|---|---|
| 5,886,854 | A * | 3/1999 | Diaz et al. ............... | 360/99.08 |
| 6,512,654 | B2 * | 1/2003 | Teshima .................. | 360/99.08 |
| 6,531,273 | B1 | 3/2003 | Olson et al. .............. | 430/543 |
| 6,863,838 | B2 | 3/2005 | Hamrock .................. | 252/62.2 |
| 7,014,366 | B2 | 3/2006 | Ohno ....................... | 384/114 |
| 7,119,235 | B2 * | 10/2006 | Hardacre et al. .......... | 568/322 |
| 7,153,974 | B2 * | 12/2006 | Schmidt et al. .......... | 548/335.1 |
| 2002/0015883 | A1 | 2/2002 | Hilarius et al. .......... | 429/188 |
| 2003/0109767 | A1 | 6/2003 | Vasina et al. ............ | 585/734 |
| 2004/0169158 | A1 | 9/2004 | Kato et al. .............. | 252/299.2 |
| 2004/0179758 | A1 * | 9/2004 | Ohno ....................... | 384/100 |
| 2006/0011887 | A1 | 1/2006 | Kato et al. .............. | 252/299.3 |

FOREIGN PATENT DOCUMENTS

| | | |
|---|---|---|
| JP | H05-025488 A | 2/1993 |
| JP | 2000-001694 A | 1/2000 |
| JP | 2001-234187 A | 8/2001 |
| JP | 2002-187863 A | 7/2002 |
| JP | 2002-265394 A | 9/2002 |
| JP | 2003-031270 A | 1/2003 |
| JP | 2003-165981 A | 6/2003 |

(Continued)

OTHER PUBLICATIONS

IBM RD 457173, "Fluid bearing spindle motor with special lubricant", May 2002.*

(Continued)

*Primary Examiner*—Julie Anne Watko
(74) *Attorney, Agent, or Firm*—Volentine & Whitt, PLLC

(57) ABSTRACT

An ionic liquid is utilized as the dynamic-pressure fluid charged inside a bearing space formed in the gap where an axial bushing (axial component) [21] and a bearing sleeve (bearing component) [13] oppose. Designing a dynamic-pressure bearing device is made possible virtually without having to consider such factors as how to control dynamic-pressure-fluid evaporation or how to secure electrical continuity between the axial bushing and the bearing sleeve. Owing to ionic liquids' property of not hydrolyzing, deterioration of the dynamic-pressure fluid from moisture absorption, oxidation, etc. is inhibited, yielding a dynamic-pressure bearing device with a long lifespan.

11 Claims, 4 Drawing Sheets

| | FOREIGN PATENT DOCUMENTS | |
|---|---|---|
| JP | 2003-186138 A | 7/2003 |
| JP | 2003-194060 A | 7/2003 |
| JP | 2003-254732 A | 9/2003 |
| WO | WO2004/065523 A1 | 8/2004 |
| WO | WO2005/035702 A1 | 4/2005 |

OTHER PUBLICATIONS

Holbrey and Seddon, "Ionic Liquids", Clean Products and Processes 1 (Springer-Verlag 1999) 223-236.*

* cited by examiner

DYNAMIC-PRESSURE BEARING DEVICE AND DISK DRIVE

BACKGROUND OF THE INVENTION

1. Technical Field

The present invention relates to a dynamic-pressure bearing device having a configuration in which an ionic liquid is charged into a bearing space formed in between a shaft piece and a sleeve. The present invention relates further to a disk drive in which such a dynamic-pressure bearing device is installed, and to a method of keeping such a dynamic-pressure bearing device in storage.

2. Description of the Related Art

The development of dynamic-pressure bearing devices capable of supporting various rotary components stably even under high-rpm operating conditions has been progressing in recent years. In dynamic-pressure bearing devices the sleeve part and the shaft piece, which is inserted into the sleeve part with the one being rotatable relative to the other, are each furnished with dynamic-pressure surfaces, and the bearing devices are configured with the sleeve-section dynamic-pressure surfaces arranged opposing the shaft-component dynamic-pressure bearing surfaces. The clearances in between the dynamic-pressure surface pairs disposed in opposition are filled with dynamic-pressure fluid consisting of a liquid such as oil, or a gas such as air. The pairs of dynamic-pressure surfaces and the dynamic-pressure fluid that fills the intervals between them constitute dynamic-pressure bearing sections. Thus, dynamic-pressure devices are configured so that in the dynamic-pressure bearing sections dynamic pressure is produced in the dynamic-pressure fluid when the sleeve part spins or the shaft piece spins, as either of which will be the case depending on the design; it is this dynamic pressure that operates as shaft-supporting force in the dynamic-pressure devices.

A variety of dynamic-pressure fluids are employed in such dynamic-pressure bearing devices. In selecting the dynamic pressure fluid for the devices, balancing viscosity with extent of vaporization is primarily taken into consideration. Ordinarily an ester-based oil is adopted. To guarantee the longevity of the bearing devices, the pace at which a lubricating liquid evaporates has to be kept down. In small-scale dynamic pressure bearing devices in particular, because the surface area of the lubricating liquid tends to be relatively large with respect to the volume of lubricating liquid that the bearings can store, reducing the pace of evaporation is crucial. Lubricating liquids whose pace of evaporation is low, however, generally have a high viscosity. In dynamic-pressure bearing implementations in which a high-viscosity lubricating liquid is used, losses in the bearing devices are significant, making it difficult to achieve satisfactory performance.

Meanwhile, there are also applications that call for electrical continuity between the bearing-device shaft-component section and sleeve section, as is the case with disk drives for example. Such cases require that the dynamic-pressure fluid be lent electroconductivity. One method of lending electroconductivity to a dynamic-pressure fluid is to add a conductivity-imparting agent to the fluid. Nevertheless, the addition of a conductivity-imparting agent can give rise to problems such as deteriorating the wearability (resistance to wear) of the fluid, or else causing evaporation of the fluid to accelerate.

BRIEF SUMMARY OF THE INVENTION

An object of the present invention is to make available a dynamic-pressure bearing device utilizing a lubricating fluid whose evaporation rate is low, and whose relative viscosity is comparatively small. In addition, the invention relates to a disk drive utilizing the dynamic-pressure bearing device, and to a method of keeping the dynamic-pressure bearing device in storage.

In a dynamic-pressure bearing device of the present invention, an ionic liquid is utilized as the lubricating fluid that generates dynamic pressure.

The ions that constitute salts such as NaCl have a highly symmetrical structure. In contrast, although ionic liquids are substances that fall into the category of salts, as does NaCl, the ions making up an ionic liquid possess an asymmetrical structure. The ions' lack of symmetry is thought to produce the dissolved state of ionic liquids at ordinary temperatures. A characteristic property of ionic liquids such as utilized in the present invention is that their vapor pressure remains roughly zero both under atmospheric pressure and under a vacuum. Thus, in the present invention there is virtually no need to take the vapor pressure of the dynamic-pressure fluid, which would otherwise be a limiting characteristic in designing a dynamic-pressure bearing device, into consideration.

With an ionic liquid, electroconductivity is assured without the addition of an electroconductive agent or similar additive, since the liquid is itself a conductive substance. What is more, ionic liquids are chemically stable, and have the property of not hydrolyzing. And changes in the characteristics due to moisture absorption or to oxidation are almost unheard-of. These properties facilitate prolongation of the bearing lifespan.

In a dynamic-pressure bearing device of the present invention, the material constituting the regions of the shaft piece and the sleeve in contact with the ionic liquid may be selected on the basis of the material's corrosion potential with respect to the ionic liquid.

In an implementation in which an ionic fluid is utilized as the dynamic-pressure fluid, due to the electroconductivity of the fluid and the action of the ions, the base materials that constitute the shaft piece and the sleeve will sometimes corrode. In order to inhibit such corrosion, if the electric potential that the base material constituting the shaft piece exhibits with respect to the ionic fluid, and the electric potential that the base material constituting the sleeve exhibits with respect to the ionic fluid are made about equal, then the inter-component difference in potential will be gone, making it possible to keep the corrosion from encroaching. Inhibiting corrosion contributes to extending the longevity of the dynamic-pressure bearing device. And because inhibiting corrosion moreover inhibits rust, dust originating in rust can be prevented from contaminating the environs of the dynamic-pressure bearing device.

In a dynamic-pressure bearing device of the present invention, the interior of the sleeve, where it is in contact with the ionic liquid, may be made up of a synthetic-polymer material. Since such plastic materials are not susceptible to corrosion, they can prevent the sleeve in contact with the ionic liquid from becoming corroded. A further advantage is that because a difference in electric potential between the sleeve interior and the shaft piece is not produced, corrosion of the shaft-component section of the bearing device is also inhibited.

The shaft piece, sleeve, and associated constituent components that make up the bearing in a dynamic-pressure bearing device of the present invention may be constituted from a synthetic-polymer material or a ceramic in the regions of those constituent components where the ionic-liquid boundary surface is located. Thus configuring the bearing device allows preventing corrosion while keeping to a minimum the regions that are covered with a plastic material or ceramic.

That is, although covering the component surfaces in their entirety with a plastic material or ceramic would be an effective way to completely prevent corrosion from the ionic liquid, having the structure be one in which the bearing-device components in their entirety are coated would in most cases invite elevated cost.

A dynamic-pressure bearing device in the present aspect of the invention is lent a structure in which the bearing-constituent components' boundary-surface proximity only is coated with a synthetic-polymer material or a ceramic, or alternatively a separate element is fit into place there. The boundary-surface proximity is the region where corrosion is liable to arise, because it is abundantly supplied with oxygen from the atmosphere. Corrosion-preventative measures are implemented for this region alone, and therefore those preventative measures are efficient. It should be noted that the crevice corrosion that is seen with stainless steels, for example, is liable to occur away from the surfaces, rather deep within the bearings. Because reducing the flow of corroding electric currents is possible even in such implementations of a dynamic-pressure bearing device according to the present invention, the corrosion-preventative measures are efficacious.

In a dynamic-pressure bearing device in another aspect of the invention, the bearing-constituent components may be at least partially constituted from a non-metallic material, such as a synthetic-polymer material or a ceramic, to which electroconductivity has been imparted. While on the one hand, plastics and ceramics withstand corroding by an ionic liquid, on the other, these materials ordinarily are not electroconductive. Consequently, utilizing these base materials lowers the electroconductivity between the shaft piece and the sleeve. As given by the present invention, utilizing a ceramic or synthetic-polymer material that has been made electroconductive enables electrical continuity between the shaft piece and the sleeve to be assured.

In a disk drive of the present invention, a dynamic-pressure bearing device as described above is installed, rotatably supporting information recording disks, and heads that playback or record information are installed. Owing to the low vapor pressure of, and to the electroconductivity of, the ionic liquid, the disks are unlikely to take on charge; moreover, a disk drive is achieved in which, though scaled down, high reliability over the long term is assured.

From the following detailed description in conjunction with the accompanying drawings, the foregoing and other objects, features, aspects and advantages of the present invention will become readily apparent to those skilled in the art.

DETAILED DESCRIPTION OF THE INVENTION

Below, modes of embodying the present invention will be explained in detail, based upon the drawings.

Figure 1:
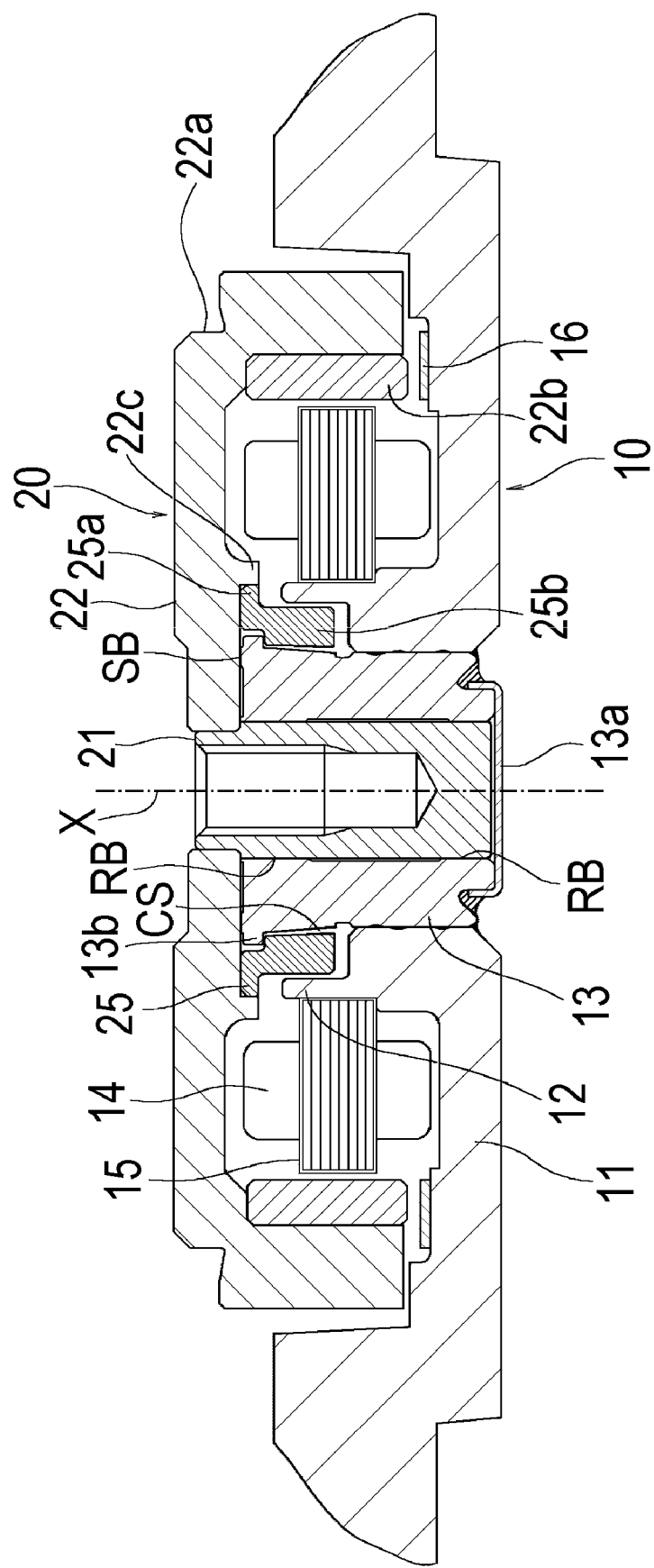
FIG. 1 is a vertical section, explanatory diagram representing in outline form an HDD spindle motor in which a shaft-rotating-type dynamic-pressure fluid bearing furnished with a dynamic-pressure bearing device in a first embodiment of the present invention is installed.

Embodiment 1—FIG. 1 represents a spindle motor, involving a first embodiment of the present invention, for hard-disk drives (HDDs). The spindle motor in FIG. 1 is made up of a stator assembly 10 as the motor anchored section, and, fit together with the stator assembly 10 by installation from above in the illustration, a rotor assembly 20 as the motor rotary section.

The stator assembly 10 includes a base frame 11 that screws fast to an HDD unit plate, the illustration of which is omitted. A hollow sleeve (bearing-device member) 13 shaped in round, cylindrical form is snuggly fitted into a cylindrical sleeve-retaining member (bearing member) 12 along its inner periphery, formed in the approximate center portion of the base frame 11. The sleeve 13 is fixed into the sleeve-retaining member 12 by pressure-fitting or by means of an adhesive. The sleeve 13 is composed of a copper-based material, such as phosphor bronze, that machines easily. A bearing hole is formed in the center of the sleeve 13, and the axial ends of the sleeve each include an opening. In addition, a stator-core unit 15 is snuggly fitted over the outer circumferential surface of the sleeve-retaining member 12. Conducting wires are wound onto component segments of the stator-core unit 15, forming stator coils 14.

A shaft piece 21 that constitutes part of the rotor assembly 20 is inserted inside the above-described bearing hole through the center of the sleeve 13, wherein the shaft piece is allowed to rotate freely about its rotation-center axis X In the present embodiment, the shaft piece 21 consists of stainless steel.

Dynamic-pressure surfaces formed on the inner circumferential surface of the sleeve 13 radially oppose, across a micro-gap, dynamic-pressure surfaces formed on the outer circumferential surface of the rotary shaft piece 21. In this micro-gap part of the bearing device, radial dynamic-pressure bearings RB, RB, are formed in two places set apart at an appropriate axial spacing. In each radial dynamic-pressure bearing RB, the dynamic-pressure surface along the sleeve 13, and the dynamic-pressure surface along the rotary shaft piece 21 are spaced apart via a radial gap of several μm. The bearing space interior including these radial gaps is filled with a dynamic-pressure fluid.

An ionic liquid is utilized as the dynamic-pressure fluid. Ionic liquids go by other names, such as "room-temperature molten salts" or "ion liquids," as well. (Examples in which such usage appears include Japanese Unexamined Pat. App. Pub. Nos. 2002-187863, 2002-265934, 2003-165981, 2003-186138.) In ionic liquids, different from classic salts such as NaCl, the ions constituting the salt possess a complex form, with the salt staying in a molten state even under normal- and lower-temperature environments. A clear explanation as to the causative factor behind the drop in melting point of ionic liquids cannot altogether be given at present. Nevertheless, ionic liquids at room temperature, with their vapor pressure being extremely low—so much so that the vapor pressure can be deemed zero for all practical purposes—share the property in common of practically not volatizing not only under atmospheric pressure, but even under a vacuum.

Radial dynamic-pressure-generating grooves in, for example, a herringbone geometry are formed in the dynamic-pressure surfaces along at least one of either the sleeve 13 or the rotary shaft piece 21. The dynamic-pressure-generating grooves are formed in two axial separated locations. (Illustration omitted.) When the rotary shaft piece 21 spins with respect to the sleeve 13, the pumping action of the radial dynamic-pressure-generating grooves produces dynamic pressure in the dynamic-pressure fluid consisting of an ionic liquid described above. The dynamic pressure, acting on the rotary shaft piece 21, keeps the shaft piece 21 out of contact with the sleeve 13. A rotary hub piece 22, fixed to the shaft piece 21, is rotatively supported as a result.

The opening provided in the lower end, in the illustration, of the sleeve 13 is closed over by a cover 13a, which makes it so that the dynamic-pressure fluid within the above-described radial dynamic-pressure bearings RB, RB will not leak out to the exterior.

Meanwhile, the upper end face, illustration-wise, of the sleeve 13, and the undersurface, illustration-wise, of the abovementioned rotary hub piece 22 are disposed so as to oppose axially in an adjacent state along the inner part of the hub piece 22. A thrust dynamic-pressure bearing SB is provided in the area of axial opposition between the upper end face of the sleeve 13 and the undersurface of the rotary hub piece 22. Thrust dynamic-pressure-generating grooves (illustration omitted) in, for example, a spiral geometry are formed in at least one of either of dynamic-pressure surfaces of the sleeve 13 or hub piece 22 that constitute the thrust dynamic-pressure bearing SB.

These thrust-bearing-constituting dynamic-pressure surfaces, that of the sleeve 13 along its upper end face, and, adjacently opposing the sleeve end face, that of the rotary hub piece 22 along its undersurface, are disposed in axial opposition across a micro-gap of several μm. This micro-gap is filled with the same dynamic-pressure fluid consisting of an ionic liquid that the above-described radial dynamic-pressure bearings RB, RB are filled with. The bearing device is charged with this ionic-liquid-constituted dynamic-pressure fluid in an essentially continuous manner and without interruption, from the foregoing radial dynamic-pressure bearings RB, RB to the thrust dynamic-pressure bearing SB.

When the spindle-motor rotary components, including the rotary shaft piece 21 and the rotary hub piece 22, spin, dynamic-pressure force is produced in the ionic-liquid-constituted dynamic-pressure fluid by the action of the above-described thrust dynamic-pressure-generating grooves. Thus the bearing device is configured so that the spindle-motor rotary components, lifted in the thrust direction by this dynamic-pressure force, are axially supported to be out of contact.

The rotary hub piece 22 that together with the rotary shaft piece 21 constitutes the rotary assembly 20 is formed in roughly a cup form, and is capable of carrying a variety of information-recording media disks such as magnetic disks. The upper-end portion of the shaft piece 21 is pressure-fitted into a joining hole provided in the center of the hub piece 22, and by fixing the joint using a fixing means such as shrink-fitting or an adhesive, the shaft piece 21 and the hub piece 22 are made unitary.

The rotary hub piece 22 on its outer periphery includes an annular trunk part 22a in order to constitute the rotor section of the motor. A diametrically magnetized, round rotor magnet 22b in cylindrical form, in which N-poles and S-poles spaced uniformly in the circumferential direction appear in alternation, is fixedly fitted to the annular trunk part 22a along its inner circumferential surface. The rotor section is constituted by the annular trunk part 22a and the rotor magnet 22b. The rotor magnet 22b is disposed so that its inner circumferential surface diametrically opposes the outer circumferential surface of the aforementioned stator core unit 15.

The lower end face axially of the rotor magnet 22b is in an axial-facing positional relationship with a magnetic attraction plate 16 attached to the foregoing base frame 11. Magnetic attraction between these two components 22b and 16 draws the rotary hub piece 22 as a whole toward the base frame 11. This magnetic attractive force is in the direction opposite to that of the dynamic-pressure force that the thrust dynamic-pressure bearing SB generates, and by the balancing of these two forces, the rotor section spins stably.

A composite-fluid seal section CS is formed along the circumferential periphery of the foregoing sleeve 13. The composite-fluid seal section CS is provided radially outward of the earlier-described, sleeve/hub axial-opposition area that includes the thrust dynamic-pressure bearing SB. The gap in which the composite-fluid seal section CS is formed connects with the micro-gap constituting the thrust dynamic-pressure bearing SB, at the diametrically outer side of the thrust bearing.

A sloping-wall surface along the inner-circumferential side of the composite-fluid seal section CS is formed by the outer circumferential face of the sleeve 13. Likewise, a sloping-wall surface along the outer-circumferential side of the composite-fluid seal section CS is formed by the inner circumferential face of an annular trunk member 25. Of these sloping faces, the sloping face on the inner circumferential side is at a sharper incline than the sloping face on the outer circumferential side, and thus the composite-seal sealing gap is configured to expand heading downward in the figure.

By its sealing gap having this downward-flaring structure, the composite-fluid seal section CS prevents external outflow of the ionic liquid that is the lubricating fluid. At the same time, because the gap as a whole is configured to slope diametrically inward, the centrifugal force acting when the rotor section spins operates to stop the ionic liquid from flowing out to the exterior.

The annular trunk member 25 is formed by milling a ring-shaped blank. Along its circumferential periphery the annular trunk member 25 is furnished with a platelike hub-attachment part 25a where the trunk member 25 is fixed to the hub piece 22. An anchoring ridge 22c is formed in the hub piece 22, and inward-directed plastic deformation of the ridge fixes the hub-attachment part 25a in place.

A retaining-interlock brim part 13b, projecting so as to jut radially outward, is provided on the circumferentially peripheral portion of the sleeve 13 along its illustration-wise upper end. Part of the retaining-interlock brim 13b is disposed axially opposing an illustration-wise upper-edge surface of the bulk portion 25b of the annular trunk member 25. When force tending to pull the rotor section loose from the sleeve is exerted on the rotor section, the annular trunk member bulk portion 25b abuts on the retaining-interlock brim part 13b. In this way the two components 13b and 25b function to retain the rotor section against slipping out.

Because ionic fluids, which have the property of a vapor pressure that is almost zero, are utilized as the dynamic-pressure fluid in dynamic-pressure bearing devices according to the present embodiment, the necessity of taking into consideration to what extent the dynamic-pressure fluid will tend to evaporate, which would otherwise be limiting factor in designing the dynamic-pressure bearing device, is practically nil. A further advantage is that since ionic liquids are themselves electroconductive substances, electroconductivity of the dynamic-pressure fluid is secured without having to add electroconductive additives to the fluid as has traditionally been the case, which eliminates the need to take into consideration the characteristics of the dynamic-pressure fluid in this regard as well. Moreover, with ionic liquids, which have the property of not hydrolyzing, since qualitative changes due to moisture absorption and oxidation are almost unheard-of, there is no shortening of bearing lifespan due to deterioration of the dynamic-pressure fluid.

Figure 2:
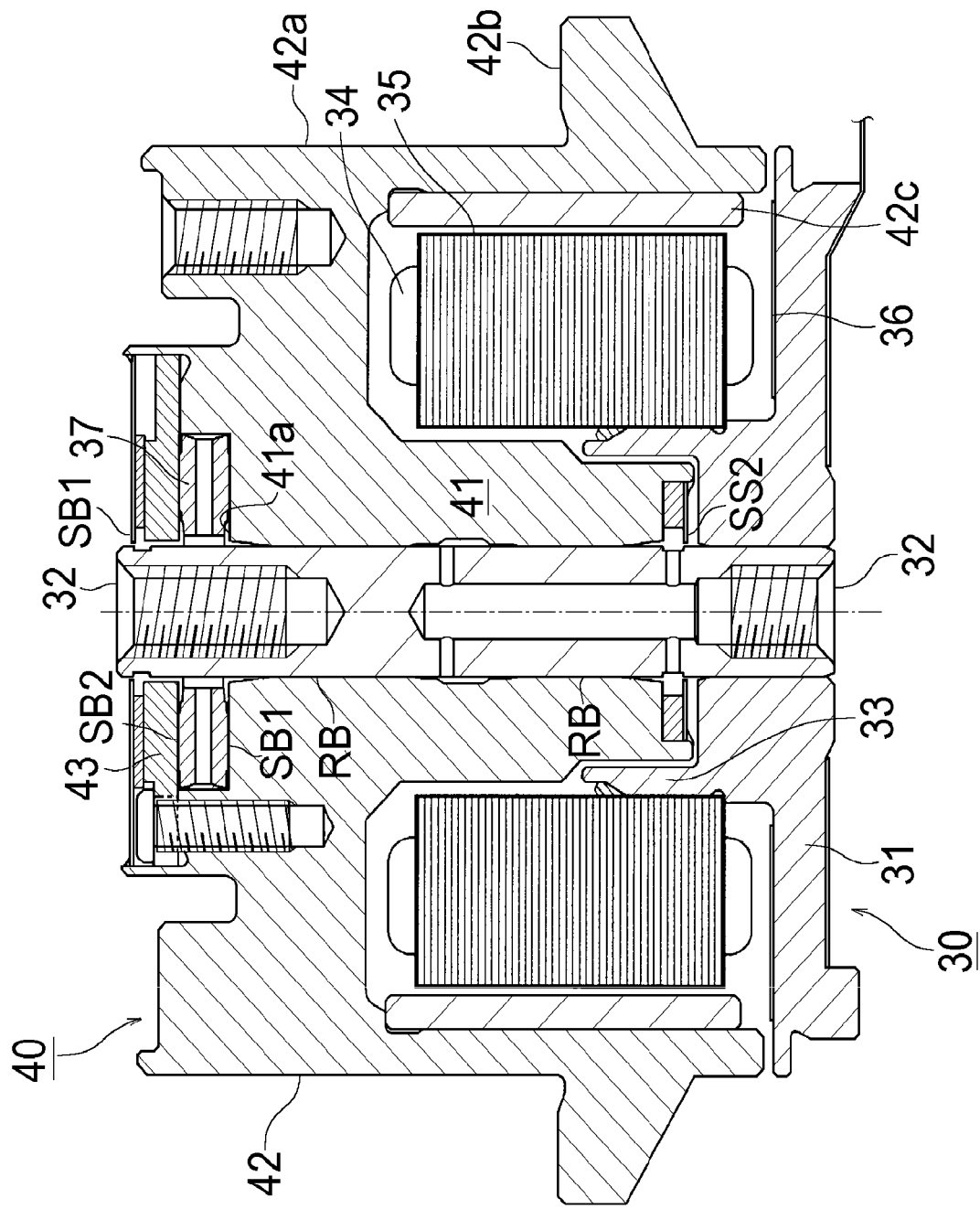
FIG. 2 is a vertical section, explanatory diagram representing in outline form an HDD spindle motor in which a shaft-anchored-type dynamic-pressure fluid bearing furnished with a dynamic-pressure bearing device in a second embodiment of the present invention is installed.

Embodiment 2—FIG. 2 illustrates an embodiment of the present invention applied to a shaft-stationary, outer-rotor type of spindle motor. This shaft-stationary, outer-rotor spindle motor has as its constituent elements a stator assembly 30 as the motor anchored component, and, fit together with the stator assembly 30 by installation from above in the illustration, a rotor assembly 40 as the motor rotary component.

The stator assembly 30 includes a base frame 31 that screws fast to an HHD (hard-disk drive) unit plate, the illustration of which is omitted. In the approximate center portion of the base frame 31, a stationary shaft (shaft piece) 32 made from stainless steel is attached perpendicularly to and unitarily with the base frame 31.

A sleeve 41 that is a constituent of the rotor assembly 40 is fitted over the stationary shaft 32, wherein the sleeve is allowed to rotate freely. A center hole is formed in through the sleeve 41, penetrating the sleeve along its center axis, with the stationary shaft 32 being inserted into the center hole. Dynamic-pressure surfaces formed on the inner circumferential surface of the sleeve 41 radially oppose, across a micro-gap, dynamic-pressure surfaces formed on the outer circumferential surface of the stationary shaft 32. In this micro-gap part of the bearing device, radial dynamic-pressure bearings RB, RB, are formed in two places separated by an appropriate axial span. In each radial dynamic-pressure bearing RB, the dynamic-pressure surface along the sleeve 41, and the dynamic-pressure surface along the stationary shaft 32 oppose across a radial gap of several μm, forming a bearing space. The bearing space interior is filled with an ionic liquid that is the same as what was explained in the foregoing Embodiment 1.

Radial dynamic-pressure-generating grooves (the illustration of which is omitted) in, for example, a herringbone geometry are formed in at least either one of the twin dynamic-pressure surfaces of the sleeve 41 and the stationary shaft 32. When the sleeve 41 is rotationally driven, dynamic pressure is generated in the ionic liquid by the action of the radial dynamic-pressure-generating grooves. This dynamic pressure supports the rotary assembly 40 with respect to the shaft piece (stationary shaft 32).

A thrust ring 37, which also serves as a retaining component to keep the sleeve 41 and its rotary hub body 42 from slipping out, is attached to the upper-end portion, illustration-wise, of the stationary shaft 32. Dynamic-pressure surfaces are formed respectively on the two top and bottom, in the illustration, axial end faces of the thrust ring 37, and the thrust ring 37 is disposed within a recess 41a formed as an annular depression in the center portion of the upper end, illustration-wise, of the sleeve 41. Further, in the portion of this bearing device directly above the thrust ring 37, a discoid counterplate 43 is fixed by screw-fastening it to the rotary hub body 42, so as to cover the thrust ring 37.

The dynamic-pressure surface on the top side, in the figure, of the thrust plate 37 opposes, across a micro-gap of several μm, a dynamic-pressure surface on the underside of the counterplate 43. In turn, a dynamic-pressure surface on the bottom side, in the figure, of the thrust ring 37 opposes, across a micro-gap of several μm, a dynamic-pressure surface on the upper end of the sleeve 41. These gaps between opposing dynamic-pressure surfaces are filled with an ionic liquid as a dynamic-pressure fluid, wherein a pair of thrust bearings SB1 and SB2 is formed on the top and bottom of the thrust ring 37.

Sealing elements SS1 and SS2 for preventing the dynamic-pressure fluid, consisting of an ionic fluid as previously described, from leaking out to the bearing-device exterior, are provided respectively on sites corresponding to the axially outer ends of the counterplate 43 and the sleeve 41. These two sealing elements SS1 and SS2 are disposed flanking the two axial ends of the bearing space including the radial dynamic-pressure bearings RB, RB and the thrust dynamic-pressure bearings SB1 and SB2.

The dynamic-pressure bearing device of the present embodiment example has in two locations radial dynamic-pressure bearings RB, RB, and has in two locations—on the top and bottom of the thrust ring 37—thrust dynamic-pressure bearings SB1, SB2. In this example, differing from the dynamic-pressure bearing device of Embodiment 1, air fills the intervals between the bearings in these four locations, and thus boundary surfaces between the dynamic-pressure fluid and the air are formed in eight locations. On the other hand, the dynamic-pressure bearing device as structured in this embodiment does not store surplus dynamic-pressure fluid.

With a bearing of this sort, in which, relative to the dynamic-pressure fluid, the boundary surfaces are extensive, the dynamic-pressure fluid is liable to become lost to evaporation. In the present invention, however, because an ionic liquid, which is extremely unlikely to evaporate, is employed as the dynamic-pressure fluid, there is no need for concern that the dynamic-pressure fluid will run dry.

Figure 3:
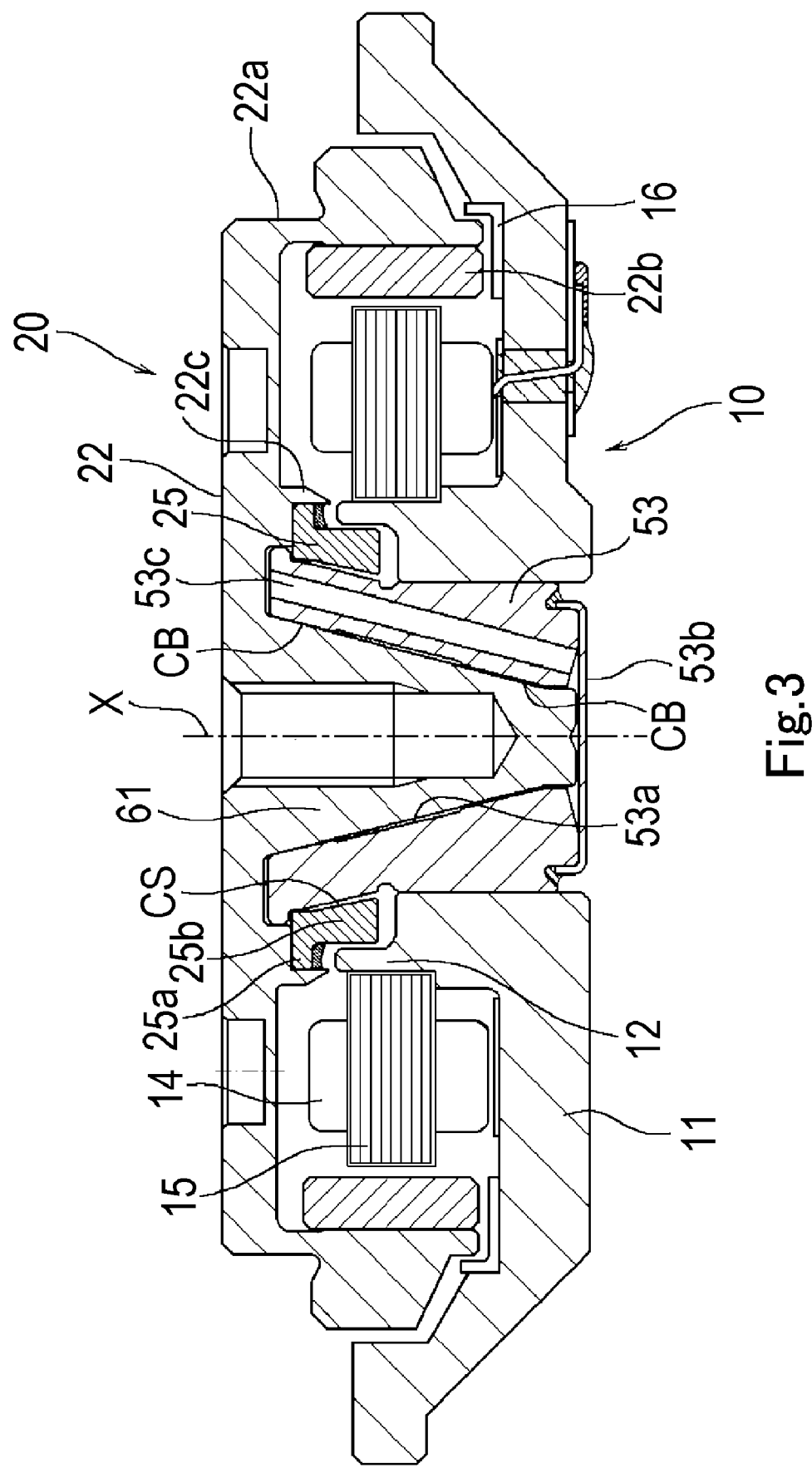
FIG. 3 is a vertical section, explanatory diagram representing in outline form an HDD spindle motor in which a shaft-rotating type of dynamic-pressure fluid bearing furnished with a conical-type dynamic-pressure bearing device in yet another embodiment of the present invention is installed.

Embodiment 3—The present invention is likewise applicable to a spindle motor furnished with a so-called conical-type dynamic-pressure bearing device, as illustrated in FIG. 3. In this implementation as well, the same actions and effects as in the embodiments described above are demonstrated. Save for the configuration of the dynamic-pressure bearing device, this shaft-rotating, outer-rotor type of spindle motor illustrated in the figure has an overall configuration that is roughly the same as that of the Embodiment 1 motor, and thus the individually corresponding constituents are labeled with identical reference marks. The configuration of the dynamic-pressure bearing device, however, is one that differs as follows.

Namely, the shaft piece 61 in the present embodiment is formed in an approximately conical shape. In the center of a sleeve 53 into which a shaft piece 61 is inserted, a conical bearing hole 53a is formed, following the shaft's conical contour. In two axially spaced locations on the shaft piece 61, dynamic-pressure-generating grooves are formed, creating respective dynamic-pressure bearings CB, CB. In the inner peripheral surface of the sleeve 53, in approximately its middle portion axially, an annular recess 53*a* is formed to have a beltlike contour. This annular recess 53*a* functions as an oil reservoir. In addition, a circulation hole 53*c* joining the top and bottom of the pair of dynamic-pressure bearings CB, CB is formed in the sleeve 53. The feature of a seal section CS formed along the lateral surface of the sleeve 53 is likewise as with Embodiment 1.

The bearing gap of the bearings, and the circulation hole 53*c*, are filled, in an essentially continuous manner and without interruption, with an ionic liquid as the dynamic-pressure fluid. The bearing gap continues to the root of the seal section CS, wherein the seal section, to midway thereof, is also filled with the ionic liquid.

An opening provided in the lower end of the sleeve 53 is closed off by a cover 53*b*. Therefore, the dynamic-pressure fluid within the conical dynamic-pressure bearings CB, CB does not leak out to the exterior.

It should be noted that the dynamic-pressure fluid is pressurized in the dynamic-pressure bearings CB, CB, which on the whole produces either a flow directed toward the tip of the shaft piece 61, or a flow directed toward the conical base of the shaft piece 61. In the bearing of the present embodiment, however, the pressure differential in the dynamic-pressure fluid at the top/bottom of the shaft piece is eliminated by the movement of dynamic-pressure fluid through the circulation hole 53*c*. Even in the present embodiment, in which the dynamic-pressure fluid is an ionic liquid, this sort of effect from the circulation hole is the same as in ordinary, oil-employing instances.

Figure 4:
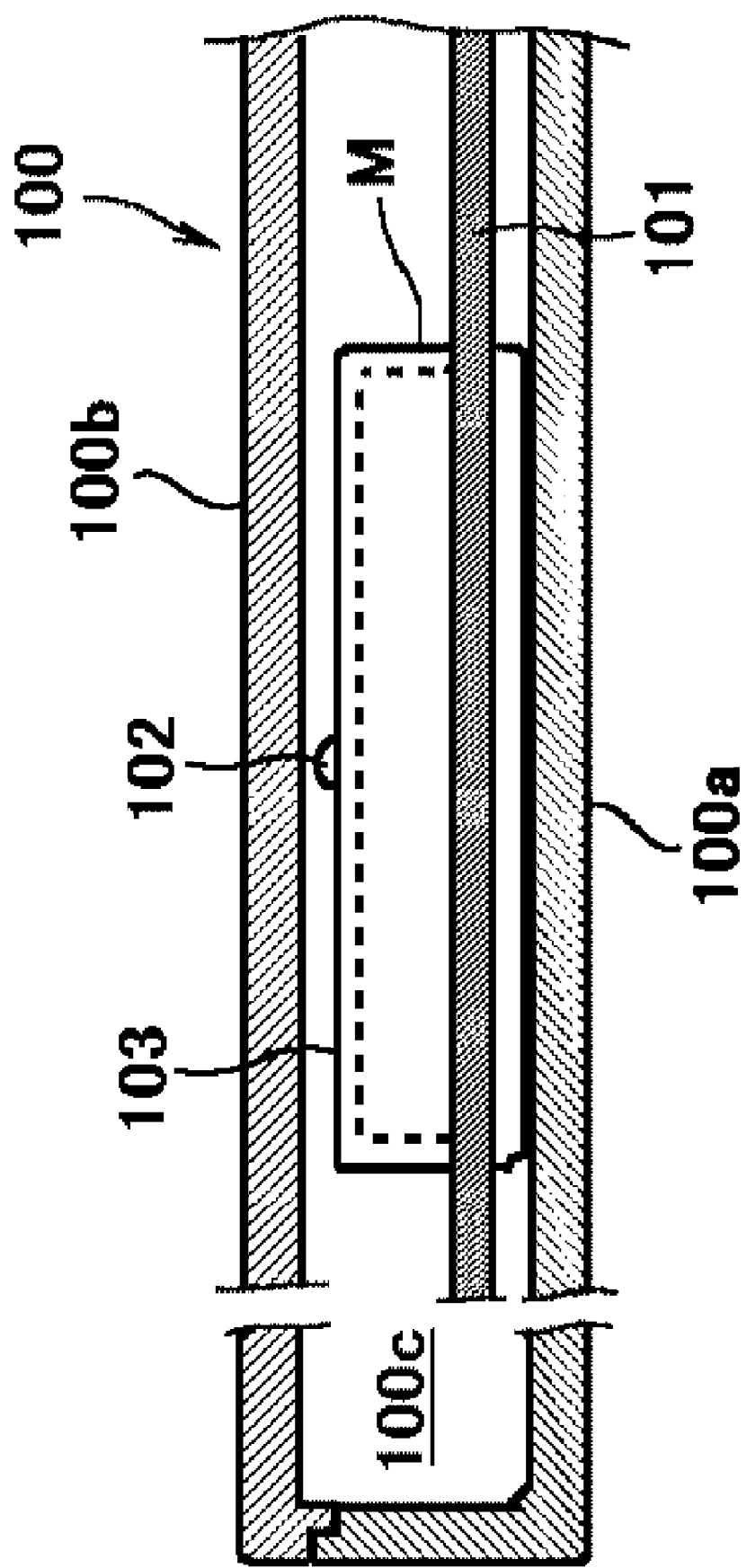
FIG. 4 is a fragmentary vertical section, explanatory diagram schematically representing an example of the structure of a disk drive employing a spindle motor furnished with a dynamic-pressure bearing device involving the present invention.

Embodiment 4—The spindle motors of Embodiments 1 through 3, employed mounted in the interior of a hard-disk drive such as is represented, for example, in FIG. 4, exhibit favorable characteristics.

As represented in FIG. 4, a spindle motor M, furnished with a dynamic-pressure bearing device involving the foregoing embodiments of the present invention, is anchored to a unit plate 100*a* that is a constituent of a housing 100 of airtight form. The space inside the housing 100, which includes the spindle motor M, is preserved as a clean space 100*c* by means of a airtight lid 100*b* that dovetails with the unit plate 100*a*. An information-recording disk 101 such as a hard disk is loaded onto the rotary hub piece (cf. reference numeral 22 in FIG. 1) in the spindle motor M, and a clamp 103 that is affixed to the rotary hub piece by a screw 102 retains the information-recording disk 101 on the rotary hub piece. In an implementation in which any of the spindle motors of Embodiment 1 to Embodiment 3 is installed, because ionic liquid is utilized as the dynamic-pressure fluid, vaporization of the fluid is extremely slight, thus keeping the clean space 100*c* clean.

MODIFICATION EXAMPLE 1

Although the invention created by the present inventors has been specifically explained based on modes of embodying the invention, it is not limited to the foregoing embodiments, in that various modifications are possible within a scope that does not deviate from the gist of the present invention.

In each of the respective Embodiments 1 through 3 described above, the sleeve is formed out of a metal component material such as phosphor bronze, but forming the sleeve from a synthetic polymer substance is also possible. In an implementation in which ionic liquid is utilized as the dynamic-pressure fluid, if the associated metal components are put into a relationship in which they differ from each other in substance—as would be the case, for example, with the shaft piece being stainless steel and the sleeve being phosphor bronze—corrosion could arise from an electric-potential difference between the two components being produced, which would be a cause of rust and similar problems. To counter this, if the sleeve is formed, as just described, from a plastic substance, then no difference in electric potential between the two components will be created, whereby electric-potential-difference-based corrosion can be averted. Liquid-crystal polymers in which fully aromatic polyesters are made dominant are preferable as the plastic substance utilized, but other synthetic polymers are also usable.

Inhibiting potential-difference-based corrosion averts contamination caused by the rust and other taint that corrosion creates, and sustains at a favorable level the cleanness within, for example, a hard-disk drive. It will be appreciated that by the advance addition of graphite, or carbon fibers, etc., to the synthetic polymer in order to lend it electroconductivity, the rotor section can be prevented from taking on an electric charge.

To ensure the mechanical durability of the dynamic-pressure surfaces, the substance of the sleeve more preferably is a metal material rather than a synthetic polymer. In such implementations, there is little choice but to constitute the shaft piece and the sleeve of a metal material.

In order to avert potential-difference-based corrosion, the simplest approach is to constitute all the components that the ionic liquid contacts, starting with the shaft piece and the sleeve, from the same substance. Nevertheless, due to problems with machinability and to other difficulties, manufacturing all of the parts from a single type of base material often proves to be difficult.

In situations in which there is no alternative to using materials that differ in type, materials whose corrosion potentials are close should be utilized. With the materials—such as stainless steel and nickel—that are employed in dynamic-pressure bearing devices, however, they are often used with the surfaces covered with a passivation film. It is therefore necessary to compare the corrosion potentials of materials on which a passivation film has been formed, and from them select materials whose potentials are equal. The pairing of nickel, formed by a technique such as electroless nickel plating, with an austenitic stainless steel is one example that can be given of such a combination of materials. The combination of titanium with an austenitic stainless steel is also satisfactory.

If an ionic liquid is to be utilized as a dynamic-pressure fluid, furthermore, the possibility of the passivation film becoming unstable due to the presence of ions has to be considered. Because metal materials that have lost their passivation film will become activated, even a combination that does not produce an electric-potential difference will become altered. These factors necessitate surveying for and determining combinations that are compatible with the ionic liquid employed, and in which the difference in electric potential will be minimal.

It should be noted that passivation-film destabilization due to the ionic liquid need not be taken into consideration with titanium, zirconium, molybdenum, and tantalum, or alloys in which they are dominant, because passivation films are far more stable on these metals compared with stainless steel materials. In implementations in which the films are formed on the component surfaces by physical vapor deposition (PVD) or a like technique, dynamic-pressure bearing devices in which an ionic liquid is utilized can be designed without much concern for corrosion.

MODIFICATION EXAMPLE 2

When selecting the substances that constitute the shaft piece and the sleeve, having the entire shaft piece or the entire sleeve be of the same base material is not absolutely essential. One way to do this is to form—by, for example, electroless nickel plating as aforementioned—a layer of a separate material onto the surface alone, to cover the surface in its entirety with a separate material. Moreover, it is not necessary that the region with the separate material be the entire surface.

Fairly peculiar phenomena such as crevice corrosion aside, corrosive reactions are most vigorous in the vicinity of the boundary surface(s), where the supply of oxygen is most abundant. Thus, as far as anti-corrosion measures to be taken in a dynamic-pressure bearing device in which ionic liquid is utilized are concerned, the vicinity of the boundary surface(s) is the critical area. Inasmuch as the supply of oxygen is relatively slight in the regions lying away from the boundary surface, toward the interior of the bearing, corrosion is unlikely to occur.

Therefore, changing to a highly anticorrosive base material for only those parts employed in the region in which the boundary surface of the ionic liquid positions itself is a lost-cost, effective strategy against corrosion. Taking the dynamic-pressure bearing device of FIG. 1 as an example, since the ionic-liquid boundary surface positions itself in the composite seal section CS, the regions in which the strategy should be implemented are the outer circumferential surface of the sleeve 13, and the annular trunk member 25. An advantageous implementation in this respect is to coat the outer circumferential surface of the sleeve 13 with titanium by PVD, and to make the annular trunk member 25 of a ceramic. Alternatively, electroless nickel plating may be implemented on the annular trunk member 25 alone.

The present invention as described in the foregoing can be adopted broadly in dynamic-pressure bearing devices utilized in rotary driving apparatus—such as, to begin with, various motors, and including diverse devices such as disk drives.

What is claimed is:

1. A dynamic-pressure bearing device comprising:
   a shaft piece superficially on which dynamic-pressure surfaces are formed;
   a sleeve into which said shaft piece is relatively rotatably fitted, and superficially on which are formed dynamic-pressure surfaces opposing, spaced apart at a bearing gap from, the dynamic-pressure surfaces on said shaft piece; and
   a room-temperature molten salt filling said bearing gap; wherein
   the bearing device is configured so that relative rotation between said sleeve and said shaft piece generates dynamic pressure that produces bearing-support force in the room-temperature molten salt filling the bearing gaps.

2. A dynamic-pressure bearing device as set forth in claim 1, wherein the base material constituting at least that region of said sleeve in contact with said room-temperature molten salt, and the base material constituting at least that region of said shaft piece in contact with said room-temperature molten salt exhibit approximately the same corrosion potential with respect to the room-temperature molten salt.

3. A dynamic-pressure bearing device as set forth in claim 2, wherein:
   the room-temperature molten salt filling the bearing gap forms at least one boundary surface with the surrounding air; and
   the region of the shaft piece and/or the sleeve that the boundary surface touches is constituted from one non-metallic material selected from a synthetic polymer and a ceramic.

4. A dynamic-pressure bearing device as set forth in claim 3, wherein said non-metallic material has electroconductivity.

5. A disk drive comprising:
   a spindle motor furnished with a dynamic-pressure bearing device as set forth in claim 2;
   an information-recording disk carried on said spindle motor; and
   recording heads for recording information onto, and playing back information from, said information-recording disk.

6. A dynamic-pressure bearing device as set forth in claim 1, wherein:
   the room-temperature molten salt filling the bearing gap forms at least one boundary surface with the surrounding air; and
   the region of the shaft piece and/or the sleeve that the boundary surface touches is constituted from one non-metallic material selected from a synthetic polymer and a ceramic.

7. A dynamic-pressure bearing device as set forth in claim 6, wherein said non-metallic material has electroconductivity.

8. A disk drive comprising:
   a spindle motor furnished with a dynamic-pressure bearing device as set forth in claim 6;
   an information-recording disk carried on said spindle motor; and
   recording heads for recording information onto, and playing back information from, said information-recording disk.

9. A dynamic-pressure bearing device as set forth in claim 1, wherein the base material constituting at least that region of said sleeve in contact with said room-temperature molten salt is one non-metallic material selected from a synthetic polymer and a ceramic.

10. A dynamic-pressure bearing device as set forth in claim 9, wherein said non-metallic material has electroconductivity.

11. A disk drive comprising:
    a spindle motor furnished with a dynamic-pressure bearing device as set forth in claim 1;
    an information-recording disk carried on said spindle motor; and
    recording heads for recording information onto, and playing back information from, said information-recording disk.

* * * * *